United States Patent
Lu et al.

(10) Patent No.: US 6,939,823 B2
(45) Date of Patent: Sep. 6, 2005

(54) STRIPPER AND A STRIPPING PROCESS FOR REMOVING THE FLUE GAS CARRIED BY REGENERATED CATALYST

(75) Inventors: Weimin Lu, Beijing (CN); Xieqing Wang, Beijing (CN); Xiaoxiang Zhong, Beijing (CN); Songnian Li, Beijing (CN)

(73) Assignees: China Petroleum & Chemical Corp., Beijing (CN); Research Institute of Petroleum, Beijing (CN)

( * ) Notice: Subject to any disclaimer, the term of this patent is extended or adjusted under 35 U.S.C. 154(b) by 0 days.

(21) Appl. No.: 10/767,361

(22) Filed: Jan. 29, 2004

(65) Prior Publication Data

US 2004/0184970 A1 Sep. 23, 2004

Related U.S. Application Data

(62) Division of application No. 09/795,496, filed on Mar. 1, 2001, now Pat. No. 6,723,292.

(30) Foreign Application Priority Data

Mar. 3, 2000 (CN) ......................................... 00103384 A
Mar. 3, 2000 (CN) ......................................... 00103385 A

(51) Int. Cl.[7] .............................. B01J 8/18; B01J 8/34; B01J 38/12; B01J 38/06
(52) U.S. Cl. ......................... 502/38; 422/144; 422/145; 422/213; 422/223; 502/55
(58) Field of Search .................................. 422/144, 145, 422/213, 223; 502/38, 55

(56) References Cited

U.S. PATENT DOCUMENTS 4,051,013 A    9/1977  Strother
4,629,552 A  * 12/1986 Haddad et al. ............. 208/161
4,973,452 A  * 11/1990 Owen ......................... 422/145
5,462,652 A  * 10/1995 Wegerer ..................... 208/167

OTHER PUBLICATIONS

Abstract of Chinese Patent No. CN11554400, dated Jul. 16, 1997.

* cited by examiner

Primary Examiner—Stanley S. Silverman
Assistant Examiner—Jonas N. Strickland
(74) Attorney, Agent, or Firm—Scully, Scott, Murphy & Presser

(57) ABSTRACT

A stripper and a stripping process for removing the flue gas carried by regenerated catalyst. A cylindrical stripper mainly comprises a degassing pipe at the longitudinal axis, a horizontal pipe connected with the lower end of the degassing pipe, several sets of inner annular baffles and outer annular baffles arranged in alternative arrangement along the vertical direction. Inner annular baffles are fixed on the degassing pipe, outer annular baffles are fixed on the inner wall of the cylinder. The degassing pipe has holes below each set of the inner annular baffles. The regenerated catalyst enters the stripper from the upper part, comes into a countercurrent and crosscurrent contact with steam from the annular steam conduit, and the stripped regenerated catalyst leaves the stripper from the bottom. The removed flue gas and the excessive steam enter the degassing pipe through the opening part of the degassing pipe under each set of inner annular baffles and leave the stripper from the top under the action of steam or air from the horizontal pipe. Using this stripper can minimize the amount of the flue gas carried by regenerated catalyst.

6 Claims, 2 Drawing Sheets

⇓ The regenerated catalyst moving direction
↑ The gas flow direction

⇓ The regenerated catalyst moving direction
↑ The gas flow direction

STRIPPER AND A STRIPPING PROCESS FOR REMOVING THE FLUE GAS CARRIED BY REGENERATED CATALYST

CROSS REFERENCE TO RELATED APPLICATION

The present application is a divisional of U.S. patent application Ser. No. 09/795,496, filed on Mar. 1, 2001 now U.S. Pat. No. 6,723,292.

BACKGROUND OF THE INVENTION

This invention is related to apparatus and processes for separating gases from solids. More particularly, it is an apparatus and a process for separating the flue gas from regenerated catalysts used in catalytic conversion processes of petroleum hydrocarbons.

Catalytic pyrolysis is a process for producing light olefins such as ethylene, propylene, as major desired products from heavy petroleum hydrocarbon feedstocks. The major procedure of this process is: heavy petroleum hydrocarbon feedstocks come into contact with a solid acid catalyst under conditions of a reaction temperature of 650–750° C., a reaction pressure of 0.15–0.4 MPa, a reaction time of 0.2–5 s, a catalyst to feed oil weight ratio (abbreviated as catalyst/oil ratio below) of 15–40:1, a steam to feed oil weight ratio of 0.3–1:1, and in the presence of high temperature steam to conduct catalytic pyrolysis process in a riser or downer reactor. The reaction products, steam and the coked catalyst are separated through a rapid gas-solid separation procedure and obtained major desired products are ethylene and propylene; the coked catalyst enters the regenerator after steam stripping and comes into contact with oxygen-containing gas to conduct coke burning for regeneration, and the hot regenerated catalyst returns to the reactor for recycle use.

Because there are a great number of pores in the catalyst, the flue gas remains in the pores and on the surface of the catalyst. Although the amount of the flue gas remaining in each pore is small, quite a deal of flue gas is carried into the reactor by the regenerated catalyst owing to the great catalyst/oil ratio and the great amount of the recycled catalyst. For a catalytic pyrolysis process unit with capacity of 1 million tons per year, if the recycle ratio is 0.4 and the catalyst/oil ratio is 20, the amount of the recycled catalyst is 3500 t/h and the amount of the flue gas carried into the reactor is about 3500 m$^3$/h, making up more than 10% of the dry gas. The flue gas contains $N_2$, $O_2$, $CO_2$, CO, $NO_x$, $SO_x$ etc. If the regenerated catalyst is directly fluidized and fed into the reactor, the flue gas is entrained by the regenerated catalyst into the reactor and becomes impurity gas, which not only increases the load of the compressor, but also hinders the normal operation of the subsequent cryogenic separation. Therefore, it is a vital problem for catalytic pyrolysis process to remove the flue gas from the regenerated catalyst. For other catalytic conversion processes, the problem of much flue gas entering the reactor is also present when the catalyst/oil ratio is rather great.

U.S. Pat. No. 4,051,013 teaches the use of a regenerated catalyst stripper in which the flue gas adsorbed on the catalyst and among the particles is stripped away through bringing the stripping medium (generally it is steam) into counter-current contact with the regenerated catalyst. The stripping gas is introduced into the stripper from bottom and the stripper contains baffles, but this patent does not describe the particular shape and structure of the baffle. This patent is practically unusable because it ignores the problem of deactivation of the catalyst at high temperature by the hydrothermal action of the steam.

CN 1154400A proposes that the regenerated catalyst is treated using a temperature-adjusting degassing drum and that the fluidizing and stripping medium is dry gas. The major component in the temperature-adjusting degassing drum is a vertical heat-removing pipe because the major objective is to change the temperature of the catalyst entering the reactor. It is impossible to control the growth of the bubbles by this structure, resulting in the worsening of the gas-solid contact and a poor stripping efficiency. Moreover, the competitively adsorbing ability of the dry gas is weak and the replacing efficiency is low. Therefore, more dry gas must be consumed to attain the same content of the flue gas contained in the regenerated catalyst after stripping. Besides, the dry gas is mixed with the flue gas during the operation, so it can not further be used and the profit is poor.

During catalytic pyrolysis process, the temperature of the regenerated catalyst is in the range 700–750° C. and if it contacts with the steam for a long time, it will deactivate. Therefore, the stripping process for the regenerated catalyst proposed in U.S. Pat. No. 4,051,013 is not suitable to the treatment of the regenerated catalyst in catalytic pyrolysis process for removing the flue gas. The process and the structure of the device proposed in CN 1154400A also have some shortcomings.

One object of the present invention is to provide a regenerated catalyst stripper.

Another object of the present invention is to provide a process for stripping the flue gas from regenerated catalysts.

SUMMARY OF THE INVENTION

The stripper provided in the present invention is characterized in that it is a vertical cylinder and comprises:

(1) a degassing pipe located at longitudinal axis;

(2) a horizontal pipe connected with the lower end of the degassing pipe;

(3) several sets of inner annular baffles fixed on the degassing pipe, the degassing pipe having holes below each set of the inner annular baffles;

(4) several sets of outer annular baffles fixed on the inner wall of the cylinder, the outer annular baffles having some small holes, the inner annular baffles and the outer annular baffles being arranged along the vertical direction in alternative arrangement and with some spacing;

(5) annular steam conduits with some small holes located in the spaces below each set of the outer annular baffles;

(6) steam introducing conduits connected with the annular steam conduits;

(7) a gas outlet at the top of the cylinder;

(8) a catalyst inlet at the upper part of the cylinder; and (9) an outlet of the stripped catalyst at the bottom of the cylinder.

The stripping process for removing the flue gas carried by the regenerated catalyst provided in the present invention is as follows: the process comprises:

(1) providing the stripper aforesaid;

(2) passing the regenerated catalyst into the stripper from its upper part, the catalyst flowing downwards via gravity, each set of the inner annular baffles directing the catalyst to flow outwards towards the same set of the outer annular baffles and then the set of the outer annular baffles directing the catalyst to flow towards the next set of the inner annular baffles, thereby several sets of the inner annular baffles and the outer annular baffles at different heights cause a zigzag flow of the catalyst in the cylinder;

(3) introducing a steam to the annular steam conduits through the steam introducing conduits, the steam flowing out from the small holes on the annular steam conduit, passing through the small holes in the outer annular baffles and coming into a countercurrent and crosscurrent contact with the regenerated catalyst, the steam rapidly replacing the flue gas carried by the regenerated catalyst, the removed gas and the excessive steam being collected under each set of inner annular baffles and entering the degassing pipe through the opening part of the degassing pipe;

(4) discharging the regenerates catalyst from the bottom of the stripper and;

(5) venting the removed flue gas and excessive steam in the degassing pipe from the top of the stripper under the action of steam or air from the horizontal pipe.

The stripper and the stripping process for removing the flue gas carried by the regenerated catalyst provided in the present invention are used in deep catalytic cracking or catalytic pyrolysis process with a rather high catalyst/oil ratio, but also is used in the conventional catalytic cracking or other improved catalytic conversion processes.

DETAILED DESCRIPTION OF THE INVENTION

Figure 1:
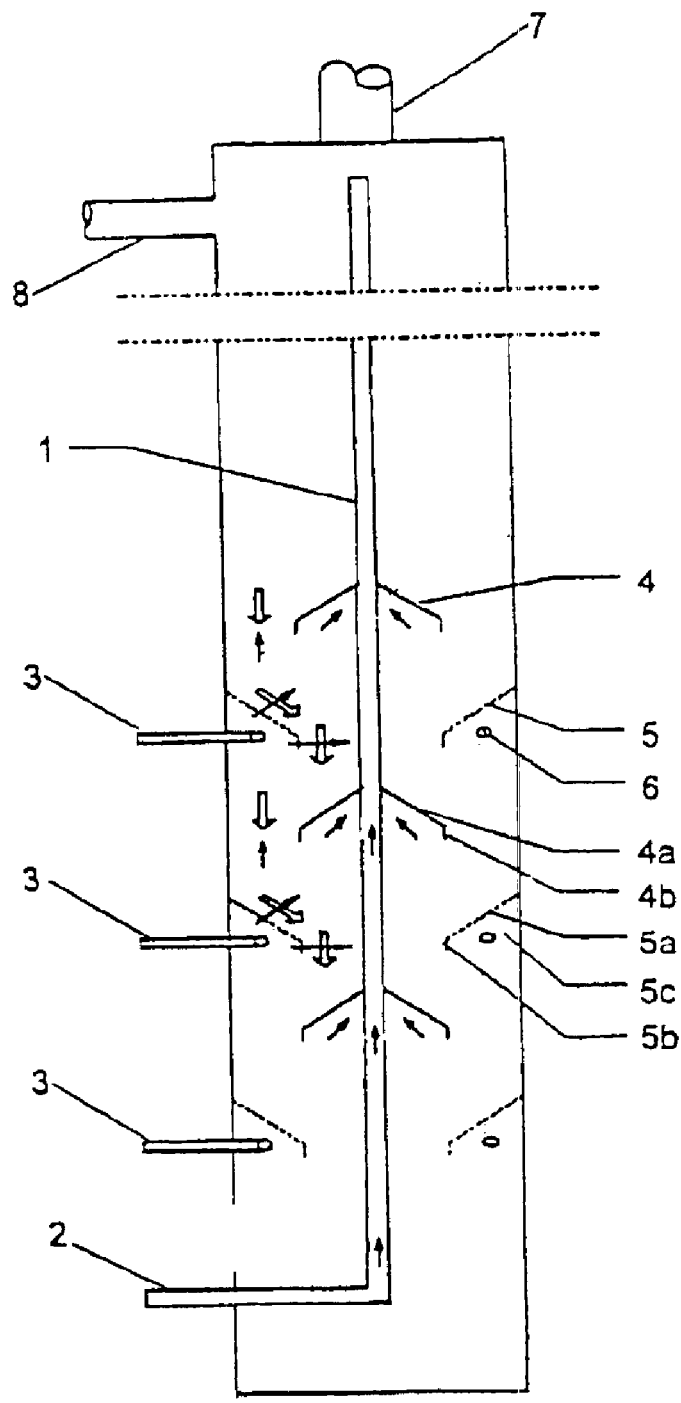
FIG. 1 is a schematic view showing the structure of the stripper for removing the flue gas carried by the regenerated catalyst provided in the present invention in which the catalyst inlet is in tangential direction.

In the stripper provided in the present invention, the ratio of height to diameter of said cylinder is 5–20:1. The diameter of the degassing pipe is the same as that of the horizontal pipe, both being 2–20% of the diameter of the cross section of the cylinder. The upper end of the degassing pipe is connected with the inner wall of the stripper through bracings for supporting.

Each inner annular baffle consists of an upper conic plate and a lower skirt. There is no hole on the conic plate and the skirt. The elevation view of the conic plate is an trapezoid and the vertical view is a ring. The ratio of the outer diameter of the ring to the diameter of the cylinder is 0.4–0.7:1; the elevation view of the skirt is a rectangle and the vertical view is a circle, the diameter of which equals the outer diameter of the ring. The opening part of said degassing pipe below the inner annular baffle is a porous ceramic pipe, an ordinary metal pipe having some small holes and covered with metal wire-mesh or a pipe rolled from ordinary metal wire-mesh. The inner annular baffle is connected with the inner wall of the stripper through bracings for supporting.

Each outer annular baffle consists of an upper conic plate and a lower skirt, both having some small holes and the opening rate being 1–5%. The elevation view of the conic plate is a trapezoid and the vertical view is a ring. The ratio of the inner diameter of the ring to the diameter of the cylinder is 0.4–0.7:1; the elevation view of the skirt is a rectangle and the vertical view is a circle, the diameter of which equals the inner diameter of the ring.

The upper catalyst inlet pipe is in tangential direction, i.e.; the entrance path of the catalyst is perpendicular to any diameter of the cross section circles of the cylinder. The catalyst inlet plays a role similar to the inlet of a preliminary cyclone.

The upper catalyst inlet is also connected with the inclined pipe of the catalyst and the angle between the inclined pipe and the vertical direction is less than or equal to 45°. The diameter of the inclined pipe is $1/10$–$1/2$ time of that of the stripper. Large-diameter pipe favors layering flow and the degassing of the catalyst.

The catalyst outlet is at the bottom of the stripper and it is connected with the catalyst conveying pipe through a transition section.

The catalyst in the stripper flows in a state of a dense phase, the mass flow rate of which is 20–200 $kg \cdot m^{-2} \cdot s^{-1}$. The velocity of the catalyst in the stripper is 0.05–0.3 m/s. In each contact section consisted of inner annular baffles and outer annular baffles, the residence time of the steam is less than 3 s.

The velocity of the regenerated catalyst entering the stripper tangentially is 10–18 m/s.

The process and the operation principle of the present invention are described in particular as follows: the regenerated catalyst carried great amounts of the flue gas from the regenerator enters the stripper from the upper part tangentially. The catalyst tends to flow towards the inner wall of the stripper viacentrifugal force while the gas tends to flow towards the central part, and thereby a preliminary separation of the flue gas from the catalyst is performed. When the regenerated catalyst inlet is connected with a inclined pipe, the catalyst directly enters the stripper from the upper part. After entering the stripper, the catalyst flows downwards via gravity. The inner annular baffles force the catalyst to flow outwards towards the outer annular baffles while the outer annular baffles force the catalyst to return and flow towards the inner annular baffles. A series of the outer annular baffles and the inner annular baffles at different heights cause a zigzag flow of the catalyst, preventing the appearance of free vertical passages with large passing sectional areas. The steam enters the annular steam conduits through the introducing conduits, then sprays out from the small holes of the annular steam conduits. The sprayed steam passes though the holes in the conic plate and the skirts of the outer annular baffles and comes into a countercurrent and crosscurrent contact with the catalyst flowing downwards and thereby replaces the flue gas among the catalyst particles and within the pores of the catalyst. Most of the steam flows directly towards the spaces below the inner annular baffles from the outer annular baffles and collects under the inner annular baffles because there is no hole in the conic plate and the skirts. The gas in the stripper tends to move towards the central part of the stripper while flowing upwards because there is a pressure difference between the dense phase bed of the catalyst in the stripper and the inside of the degassing pipe and the pressure inside the degassing pipe is lower than that of any point of the dense phase bed of the catalyst in the stripper. Most of the gas accumulates under the inner annular baffles, enters the degassing pipe from there through the holes on the degassing pipe, flows upwards, is vented into the space of dilute phase in the stripper from the outlet of the degassing pipe and leaves the stripper from the outlet pipe of the flue gas together with the gas ascending in the bed of dense phase. Steam or air is introduced from the horizontal pipe located at the lower end of the degassing pipe, the velocity of which should ensure that the fine catalyst powders entered the aforesaid ceramic pipe, ordinary metal pipe covered with metal wire-mesh or rolled metal wire-mesh pipe can be blown to the outlet of the degassing pipe to be vented into the space of dilute phase in the stripper so as to prevent the accumulation of the fine powders and a block in the degassing pipe.

The structure of the regenerated catalyst stripper is described below referring the drawing.

The FIG. 1 is a schematic, view of the structure of the stripper, in which the catalyst inlet is in tangential direction.

The structure of the regenerated catalyst stripper is as follows: the regenerated catalyst stripper is a vertical cylinder. A vertical degassing pipe 1 is located at the longitudial axis. Pipe 1 is connected at the lower end with a horizontal pipe 2. Several steam introducing conduits 3 are located on the outer wall of the stripper along vertical direction. Several sets of inner annular baffles 4 and outer annular baffles 5 are arranged along the vertical direction in alternative arrangement and with some spacing, wherein inner annular baffles 4 consisting of conic plates 4a and skirts 4b are fixed on degassing pipe 1. The part of the said degassing pipe 1 below the inner annular baffle 4 has holes and the opening part of the degassing pipe is a porous ceramic pipe, an ordinary metal pipe having some small holes and covered with metal wire-mesh or a pipe rolled from metal wire-mesh. The outer annular baffles 5 are fixed on the inner wall of the cylinder. Several annular steam conduits 6 are located in the space 5c under conic plate 5a and skirts 5b of the outer annular baffles. The annular steam conduits have some small holes in their circumference and are corrected with steam introducing conduits 3. The upper end of the stripper is connected with the flue gas pipe 7. A tangential inlet pipe 8 of the catalyst is connected with the upper part of the stripper. The stripped catalyst leaves from the lower end of the stripper.

Figure 2:
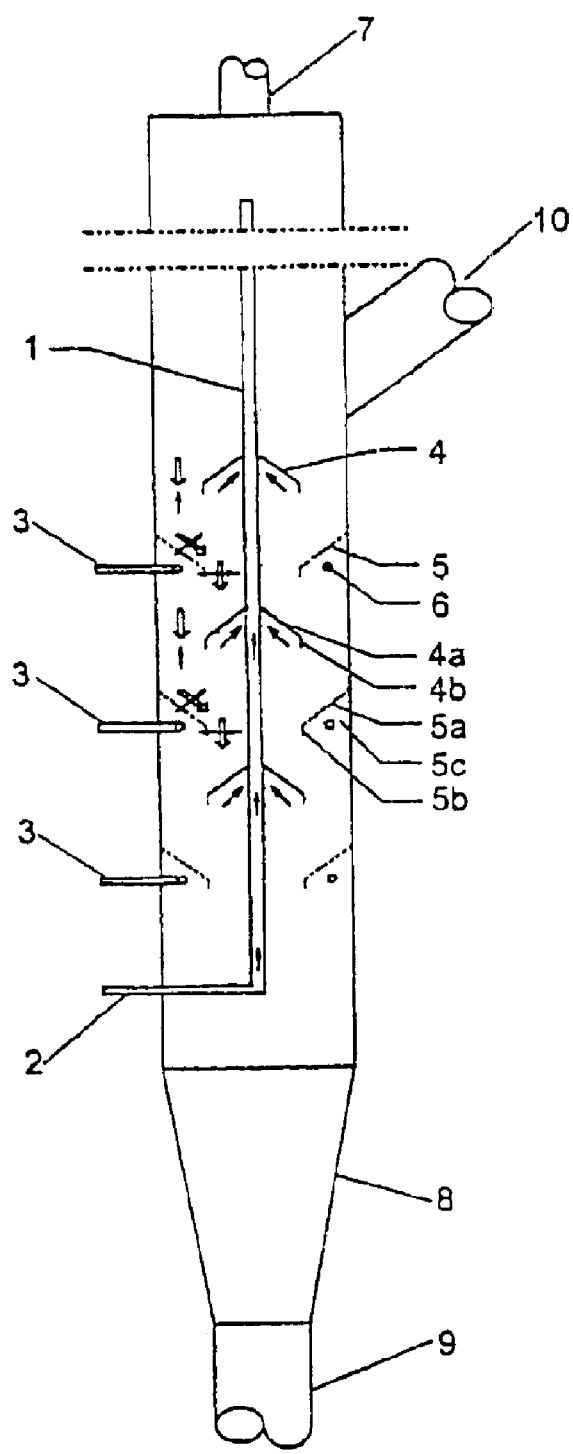
FIG. 2 is a schematic view showing the another structure of the stripper for removing the flue gas carried by the regenerated catalyst provided in the present invention in which the catalyst inlet is a inclined pipe.

FIG. 2 is a shematic view of the structure of the stripper in which the catalyst inlet is a inclined pipe.

The structure of the stripper is as follows: the stripper is a vertical cylinder. A vertical degassing pipe 1 is located at the longitudial axis. Pipe 1 is connected at the lower end with a horizontal pipe 2. Several steam introducing conduits 3 are located on the outer wall of the stripper along vertical direction. Several sets of inner annular baffles 4 and outer annular baffles 5 are arranged along the vertical direction in alternative arrangement and with some spacing, wherein inner annular baffles 4 consisting of conic plates 4a and skirts 4b are fixed on degassing pipe 1. The part of said degassing pipe 1 below the inner annular baffle 4 has holes and the opening part of the degassing pipe is a porous ceramic pipe, an ordinary metal pipe having some small holes and covered with metal wire-mesh or a pipe rolled from metal wire-mesh. The outer annular baffles 5 are fixed on the inner wall of the cylinder. Several annular steam conduits 6 are located in the space 5c under conic plates 5a and skirts 5b of the outer annular baffles. The annular steam conduits have some small holes in their circumference and are connected with the steam introducing conduits 3. The upper end of the stripper is connected with the gas outlet pipe 7. The lower end of the stripper is connected with the catalyst outlet pipe 9 through a transition pipe 8. The upper part of the stripper is connected with the catalyst inlet pipe 10.

The advantages of the present invention are as follows:

1. The flue gas carried by regenerated catalysts can be effectively removed by using the stripper and stripping process provided by the present invention.

2. Because most of the steam flows directly towards the inner annular baffles from the outer annular baffles and enters the degassing pipe under the inner annular baffles, the contact time of the steam with the high temperature regenerated catalyst in the stripper is very short, thereby preventing the hydrothermal deactivation of the catalyst.

3. Because the gas carried by the catalyst is removed and the density of the catalyst bed is increased, the driving force for the catalyst recycling is increased.

The following example further describes the process provided in the present invention, but does not limit it.

EXAMPLE

The inner diameter of the pilot stripper used in the experiment is 150 mm and its total height is 3.0 m. The inner diameter of the inclined inlet pipe of the stripper is 75 mm. The inner diameter of the degassing pipe in the stripper is 30 mm. Three sets of inner and outer annular baffles are installed in the stripper and the spacing between any two sets of adjacent baffles is 300 mm. The outer annular baffles have holes and the opening rate is 5%. The fluidizing medium for the catalyst bed in the regenerator is air and the gas superficial velocity is 0.6 m/s. The stripping medium in the stripper is nitrogen and the superficial velocity is 0.2 m/s according to its total amount. The mass flow rate of the catalyst in the stripper is about 90 $kg \cdot m^{-2} \cdot s^{-1}$. The gas carried by the catalyst at the inlet of the stripper is air, wherein the concentration of oxygen is 21%. The concentration of oxygen in the stripper gradually decreases because of the purging and replacing action of nitrogen. The relative stripping efficiency of the stripper is determined according to the concentration of oxygen in the gas carried by the catalyst at the outlet of lower part of the stripper. The result shows that, within the above testing range, the concentration of oxygen in the outlet gas decreases by 80%, i.e., the relative stripping efficiency of the stripper is 80%.

It is determined by hydrogen tracing that over 80% of the stripping medium enters the degassing pipe, flows upwards and leaves the bed rapidly with an average residence time of 1.5 s in each contact section consisted of inner annular baffles and outer annular baffles. The rest less than 20% of the stripping medium flows downwards and leaves the stripper together with the catalyst.

What is claimed is:

1. A stripping process for removing flue gas carried by regenerated catalyst, which process comprises:
   (a) providing a stripper for removing flue gas carried by regenerated catalyst, the stripper comprising:
      (1) a vertical cylinder;
      (2) a degassing pipe located at the longitudinal axis of the vertical cylinder;
      (3) a horizontal pipe connected with the lower end of the degassing pipe;
      (4) a plurality of sets of inner annular baffles fixed on the degassing pipe, wherein said inner annular baffles includes an upper conic plate and an lower skirt, the degassing pipe having an opening part below each set of the inner annular baffles;
      (5) a plurality of sets of outer annular baffles fixed on the inner wall of the cylinder, wherein said outer annular baffles include an upper conic plate and a lower skirt, the outer annular baffles having some small holes, the inner annular baffles and the outer annular baffles being arranged along the vertical direction in an alternating spaced arrangement;
      (6) annular steam conduits with some small holes located in the spaces below each set of the outer annular baffles;

(7) steam introducing conduits connected with the annular steam conduits;
(8) a gas outlet at the top of the cylinder;
(9) a catalyst inlet at the upper part of the cylinder; and
(10) an outlet for stripped catalyst at the bottom of the cylinder wherein said outlet is connected with the catalyst conveying through a transition section, (b) passing the regenerated catalyst into the stripper from its upper part, the catalyst flowing downwards via gravity, each set of the inner annular baffles directing the catalyst to flow outwards towards the same set of the outer annular baffles and then the set of the outer annular baffles directing the catalyst to flow towards the next set of the inner annular baffles, thereby several sets of the inner annular baffles and the outer annular baffles at different heights cause a zigzag flow of the catalyst in the cylinder;

(1) introducing a steam to the annular steam conduit through the steam introducing conduit, the steam flowing out from the small holes on the annular steam conduit, passing through the small holes in the outer annular baffles and coming into a countercurrent and cross current contact with the regenerated catalyst, the steam rapidly replacing the flue gas carried by the regenerated catalyst, the removed gas and the excessive steam being collected under each set of inner annular baffles and entering the degassing pipe through the opening part of the degassing pipe;

(2) discharging the stripped regenerated catalyst from the bottom of the stripper; and (3) venting the removed flue gas and excessive steam in the degassing pipe from the top of the stripper under the action of steam or air from the horizontal pipe.

2. The process according to claim 1, wherein said regenerated catalyst comes from catalytic conversion process.

3. The process according to claim 2, wherein said catalytic conversion processes are catalytic pyrolysis process, or deep catalytic cracking.

4. The process according to claim 1, wherein the velocity of the regenerated catalyst entering the stripper tangentially is 10–18 m/s.

5. The process according to claim 1, wherein the residence time of the steam in each contact section consisted of inner annular baffles and outer annular baffles is less than 3 s.

6. The process according to claim 1, wherein the velocity of the regenerated catalyst in the stripper is 0.05–0.3 m/s.

* * * * *